Aug. 5, 1969    J. W. ESTES    3,459,867
DIRECT ARC FURNACE
Filed Aug. 10, 1967
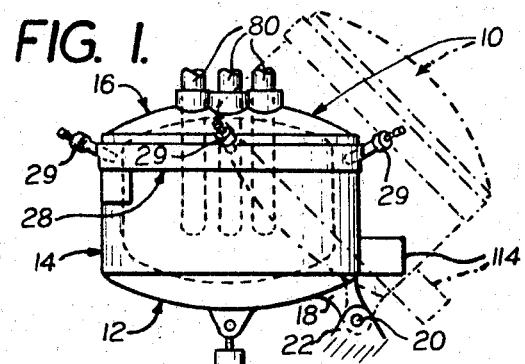
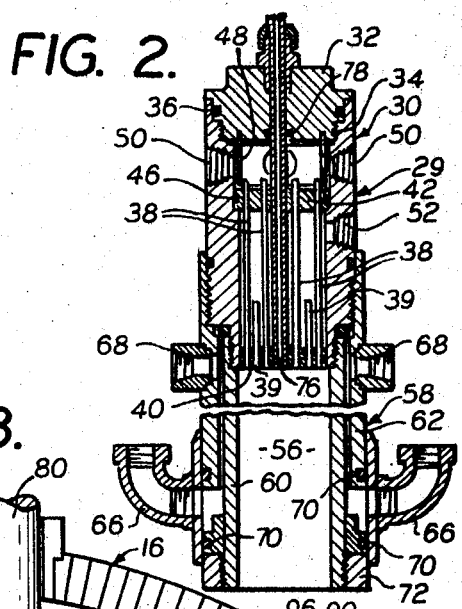
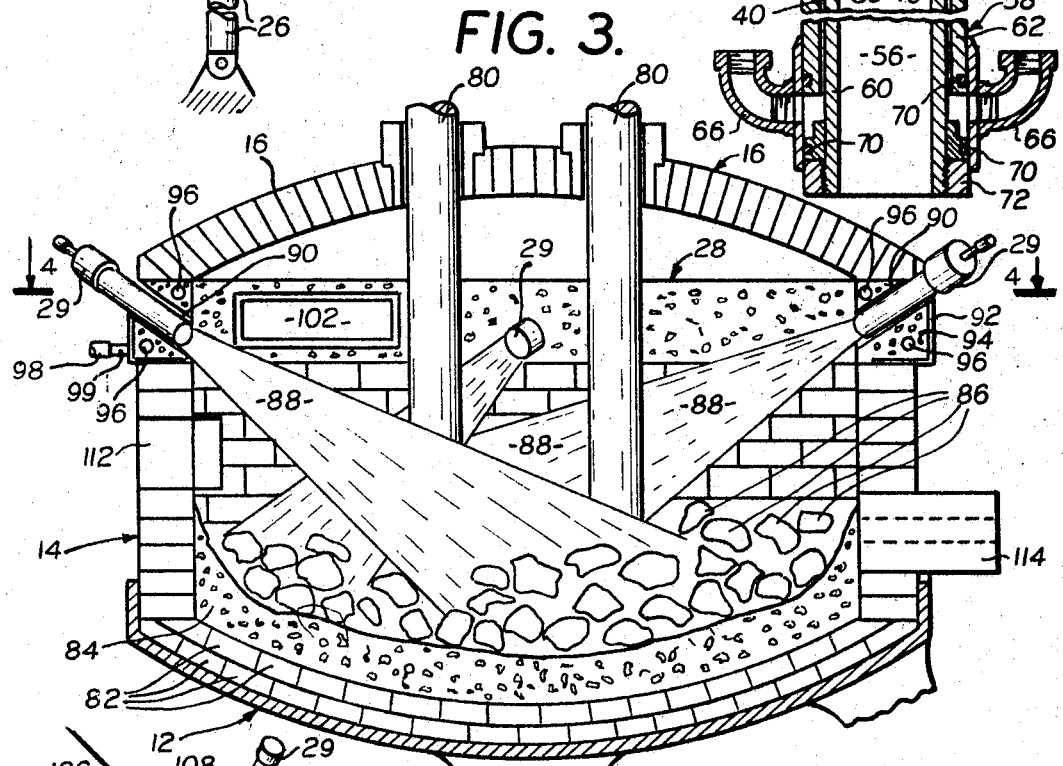
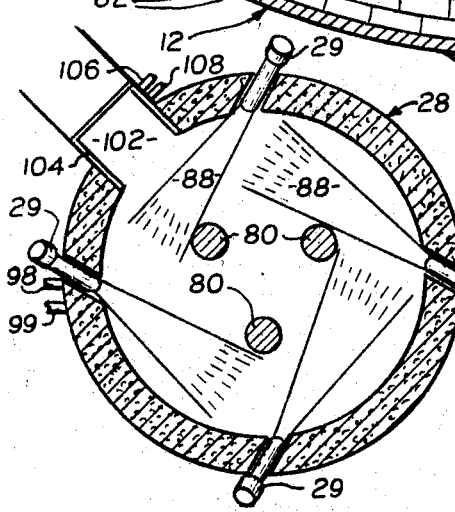
INVENTOR
JAMES W. ESTES
F. B. Henry
ATTORNEY

United States Patent Office 3,459,867
Patented Aug. 5, 1969

3,459,867
DIRECT ARC FURNACE
James W. Estes, Piscataway, N.J., assignor to Air Reduction Company, Incorporated, New York, N.Y., a corporation of New York
Filed Aug. 10, 1967, Ser. No. 659,797
Int. Cl. H05b 7/18
U.S. Cl. 13—9                                     14 Claims

ABSTRACT OF THE DISCLOSURE

A direct arc furnace having a side wall supporting a roof through which electrodes extend down to the material that is to be heated and melted in the furnace. Without requiring any other changes in this conventional construction, this invention elevates the roof and places a ring at the top of a wall and on which the roof rests at a slightly higher level. The ring, which may be steel with a refractory lining, has angularly spaced openings in which oxy-fuel burners are held for the initial heating, and there is a flue in the ring for escape of products of combustion from the furnace. The burners are water-cooled and the ring and flue may also be water-cooled. The burner flames are directed downward but in directions to avoid striking the electrodes.

Background and summary of the invention

Direct arc furnaces, such as are commonly used for melting scrap, are usually made with a side wall and a roof which may be an arch with electrodes for the furnace extending down through the roof to the level of the material that is to be melted. This type of furnace is used for processing scrap iron, ferro alloys, copper, etc.

Better results are obtained by providing auxiliary heating means comprising oxy-fuel burners for doing the initial heating and for controlling the atmosphere of the furnace.

Putting such auxiliary burners through the roof of the furnace weakens the roof structure which is ordinarily made of ceramic blocks; and with the electrodes and their holders in the roof there is not much room for oxy-fuel burners with their associated piping for fuel, oxygen and cooling water.

It has also been found that if the burners are inserted in the side walls of the furnace, they have a tendency to clog up, due to the splashing of the molten metal in the furnace. This side wall area is also cluttered with supporting mechanisms, water and cooling jackets if the burners are inserted through the side walls.

This invention utilizes a ring which is positioned between the side wall of an arc furnace and the roof of the furnace. In furnaces which can be charged from the top, it is only necessary to remove the roof, to insert the ring and to replace the roof. Thus, no permanent modifications of the existing furnace are necessary in order to incorporate this invention into a conventional furnace.

The burner ring incorporates the oxy-fuel burners, a water-cooled flue for removing the products of combustion, and water-cooled jackets or chambers to maintain the temperature of the burner ring at a suitable temperature level.

Since all apparatus and connections for the burners and the cooling are in the burner ring, the roof section is easily removed. The burner ring affords an improved flame distribution in that the burners are directed in a circumferential and tangential manner which allows the flames to be distributed over a wide surface area of the scrap within the furnace. The tangential arrangement prevents the burner flames from impinging on the electrodes in the furnace and causes the molten scrap to be intermixed.

In order to reduce the total time the furnace is in operation, the burners and the arcs may be started at the same time. This will not be the most efficient way to operate but it will result in a more rapid processing of the material. The oxy-fuel burners may, however, be ignited prior to the supplying of electric energy to the electrodes. The oxy-fuel flames will preheat the furnace walls and the scrap more efficiently at the start of the operation than if the arcs are used. After a suitable melt is accumulated in the bottom of the furnace, the oxy-fuel burners are shut down, or preferably reduced in output to only short flames, and the operation of the electric arc is continued. By maintaining a short flame on each of the oxy-fuel burners, the ports or orifices of the burners are kept clear of clogging by any splatter from the molten metal; and the supply of oxygen and fuel to the short flames of the burners can be regulated to control the atmosphere of the furnace. Thus, the atmosphere may be made reducing, neutral, or oxidizing.

It has also been found that the proper use of oxy-fuel burners in electric furnaces results in the reduction of smoke from the combustion of oily or dirty scrap.

Other objects, features and advantages of the invention will appear or be pointed out as the description proceeds.

Brief description of the drawing

In the drawing, forming a part hereof, in which like reference characters indicate corresponding parts in all the views:

FIGURE 1 is a diagrammatic elevation of a direct arc furnace made in accordance with this invention;

FIGURE 2 is a fragmentary sectional view of one of the oxy-fuel burners used in the furnace shown in FIGURE 1;

FIGURE 3 is a fragmentary, enlarged sectional view of the furnace shown in FIGURE 1, the section being taken in the plane of the paper; and FIGURE 4 is a diagrammatic sectional view, on a reduced scale, taken on the line 4—4 of FIGURE 3.

Detailed description of the invention

FIGURE 1 shows a direct arc furnace 10 having a bottom frame 12, a side wall 14 and a roof 16. The bottom frame 12 has lugs 18 by which the furnace is pivotally supported on trunnions 20 from a fixed support 22. The furnace 10 can be moved from its normal melting position, shown in full lines in FIGURE 1, to a pouring position, shown in dotted lines, by a cylinder-and-piston motor 26.

Between the upper end of the side wall 14 and the lower circumferential surface of the roof 16, there is a burner ring 28. This burner ring preferably has the same inside and outside diameters as the side wall 14 and it is placed on top of the side wall 14 and forms an upward extension of the side wall. The roof 16 rests on the top surface of the ring 28 in the same way that the roof rests on the top of the side wall in a conventional furnace. It is one of the advantages of the invention that the ring 28 can be applied to the furnace by merely lifting the roof 16 and inserting the ring 28 between the side wall 14 and the roof 16 without making any other changes in the furnace. It will be understood that fastening means for preventing lateral displacement of the ring 28 and roof 16, especially when the furnace is tilted for discharge, are provided. These means are well known in the art and no illustration of them is necessary for a complete understanding of this invention.

The ring 28 has oxy-fuel burners 29 at angularly spaced locations around the ring. In the construction illustrated, there are four burners 29. This is sufficient for most furnaces, but more or fewer burners can be used, depending upon the furnace size. With larger furnaces, the use of larger burners is preferable to an increase in the number of small burners because one of the functions of the furnace is to project flames downward against the material in the furnace at sufficient distance from the burners to cause motion and intermixing of the material being melted.

The invention is not limited to any particular type of burner. It is preferable that the burner be an oxy-fuel burner so as to obtain higher temperatures than are possible with air-fuel burners. The fuel can be solid, liquid, or gas, or combinations thereof. A suitable burner is shown in FIGURE 2 and this burner is the one illustrated in the Shepherd Patent No. 3,092,166, issued June 4, 1963.

FIGURE 2 shows a burner having a housing 30 having an end wall 32 attached to the side wall of the housing by screw threads 34 and sealed against leakage by an O-ring 36.

Within the housing 30 there is a bundle of tubes. This bundle of tubes includes long tubes 38 and short tubes 39, all of which extend through a circular partition plate 40. The tubes 38 and 39 are firmly secured to the partition plate 40.

The long tubes 38 also extend through a rearward partition plate 42 and are firmly secured thereto. The short tubes 39, however, terminate in the space between the partition plates 40 and 42. The bundle of tubes is inserted into the housing 30, before the end wall 32 is screwed into the housing; and the rearward partition plate 42 contacts with a shoulder in the housing 30, to determine the position of the bundle of tubes and to hold the bundle with the forward partition plate 40 substantially even with the forward end of the housing 30.

When the end wall 32 is screwed into position, there are chambers for gas on both sides of the rearward partition plate 42 and there is an O-ring 46 for preventing gas in either chamber from mixing with the gas in the other chamber. A baffle 48 on the end wall 32 extends across the chamber behind the rearward partition plate 42. There are holes in the baffle for admitting gas to the open ends of the long tubes 38.

The housing 30 has two threaded inlet openings 50 through which oxygen is supplied to the chamber behind the rearward partition plate 42. There is another threaded opening 52 through the wall of the housing 30 for admitting fuel gas into the chamber ahead of the rearward partition plate 42. Tube or pipe fittings are screwed into these openings 50 and 52, and these fittings communicate with sources of oxygen and fuel gas. From the construction thus far described, it will be apparent that oxygen is discharged from the long tubes 38, and fuel gas from the short tubes 39, into a chamber 56 in front of the forward partition plate 40. This chamber 56 is enclosed within a double wall sleeve 58 having an inner wall 60 spaced from an outer wall 62 along most of the length of the sleeve 58. Water is circulated through the space between the inner wall 60 and the outer wall 62.

There are fittings 66 connected with the sleeve 58 near its forward end and communicating with the space between the walls 60 and 62 for supplying cooling water to the space between these walls. Other fittings 68 are connected to the sleeve 58 near its rearward end and communicate with the space between the walls for the discharge of cooling water.

The walls 60 and 62 are preferably made of copper for good heat conduction and they are separately threaded to the housing 30 with sealing rings 70 for preventing leakage along the threads. At their forward ends, the walls 60 and 62 are connected by a fitting 72 which is free to move with respect to the outer wall 62 so as to compensate for differential expansion of the walls 60 and 62. Sealing rings 70 prevent leakage of water between the fitting 72 and the outer wall 62.

In the construction illustrated, there is a single tube 76 for supplying liquid fuel to the chamber 56. This tube 76 passes through the end wall 32 and through the partition plates 40 and 42. In the preferred construction it is secured to the partition plates 40 and 42 and thus constitutes a part of the bundle of tubes. Where it passes through an opening in the end wall 32, a sealing ring 78 is provided for preventing leakage of gas.

The tubes 38 and 39 are angularly spaced around circles. The outer tubes 38 are at 30° spacings from one another in the construction illustrated, and there are, therefore, twelve tubes around this circle. The short tubes 39 are also angularly spaced around a circle, but the circle is of less diameter and the tubes are spaced from one another by an angle of 45°. This provides for eight short tubes 39. The inner long tubes 38 are located around a circle of smaller diameter with the angular spacing of the tubes, 60°. This provides for six of the inner tubes 38.

Other combinations of the tube spacing and numbers of tubes can be used, but it is important that the oxygen and fuel issue from a plurality of tubes which are spaced from one another so that there is some clearance between the jets which are discharged from the tubes. However, the tubes should be close enough together so as to have some mixing of the eddy currents from the different gas streams.

Valves are provided in the fuel and oxygen lines and they may be used to control the oxygen-fuel ratio and thus flame size temperature and the atmosphere in the furnace.

FIGURE 3 shows the interior of the furnace 10. The electrodes which extend through the roof 16 are designated by the reference character 80. The bottom frame 12 is covered with ceramic blocks 82 which are, in turn, covered with a rammed refractory material 84, in accordance with conventional furnace construction. This rammed refractory material 84 extends part way up the inside of the ceramic block side wall 14 to the height of the intended level of molten metal in the furnace.

The material to be melted is scrap material designated by the reference character 86. Flame jets 88 are directed downwardly against the scrap material 86, from the burners 29 supported in holders 90 carried by the ring 28.

In the construction illustrated, the ring 28 is made of an annular steel channel 92 with the open side of the channel facing the center of the ring. The channel 92 is filled, or substantially filled, with ceramic material 94 which protects the steel channel 92 from direct radiation from within the furnace. In order to increase the life of the ring 28 and to make it suitable for use with higher furnace temperatures, the ring has cooling chambers comprising tubes 96 which extend around substantially the entire circumference of the ring and which have a cooling fluid inlet connection 98 and a cooling fluid outlet connection 99.

The burners 29 are adjustable by any suitable means in the holders 90 and they are preferably located so that the outlet end of each of the burners is set back slightly or, in any event, does not protrude beyond the inner surface of the ring 28 or the inner surface of the wall 14. With furnaces which are charged from the top, this protects the burners from being damaged by material dropping into the furnace. It also locates the burners so that they are less subject to splatter from the molten material in the furnace; but they are just as effective as if they projected beyond the ring.

The direction of extent of the burner holders 90 is correlated with the depth of the furnace, the size of the space in the furnace which is occupied by the electrodes 80, and with the diameter of the furnace so as to direct the flame jets 88 downward into contact with the scrap 86 at locations which are radially outward of the space occupied by the electrodes 80 and between the electrodes and the inside surface of the side wall 14, as is clearly shown in FIGURE 4. Thus the burners extend both downward and tangentially; and the flame jets 88 strike the material in the furnace with tangential components that tend to move the material counterclockwise in FIGURE 4 and to promote intermixing of the material as it melts.

Referring again to FIGURE 3, the ring 28 has another opening 102 through the steel channel 92 and through the ceramic 94. This opening 102 is substantially larger than the openings for the burners 29 and it is usually sufficient to have only one opening 102 which serves as a flue for the escape of products of combustion from the interior of the furnace. The flue opening 102 is preferably constructed with a cooling jacket 104 extending from the ring 29. This cooling jacket 104 is provided with a cooling fluid inlet connection 106 and a cooling fluid outlet connection 108, as shown diagrammatically in FIGURE 4. These cooling fluid connections 106 and 108 are accessible from outside the ring, as are the cooling connections for the burners 29 and the cooling connections 98 and 99 of the ring itself.

If the furnace 10 is not to be charged through the top, a charging door 112 is provided in the side wall 14. For the discharge of molten metal from the furnace, a spout outlet 114 is provided near the bottom of the furnace on the side toward which the furnace tips when rocked into the position shown in dotted lines in FIGURE 1.

In the operation of the furnace, the initial melting is done with the flames 88 from the burners 29, with or without using the electrodes 80. When all of the metal in the furnace is in a solid state, the flame jets 88 are a more efficient means of melting the material than are the electrodes 80.

When the melting of the material has proceeded to a substantial extent and during the final melting, the supply of oxygen and fuel gas to the burners 29 is reduced so that the burner produces only short flames which serve to prevent splatter from the molten metal from clogging the orifices of the burners and for the purpose of controlling the atmosphere of the furnace. As stated above, the oxy-fuel burners may be shut down entirely after the initial operation.

Whether solids, such as powdered coal, gas or oil, or combinations thereof are used as the fuel for the burners 29, the atmosphere in the furnace can be controlled to make it a reducing, neutral or oxidizing atmosphere by changing the relative proportion of fuel and oxygen supplied to the burners 29, as previously explained.

The preferred embodiment of the invention has been illustrated and described, but changes and modifications can be made and some features can be used in different combinations without departing from the invention as defined in the claims.

What is claimed is:

1. In combination with a direct arc furnace having a bottom portion, a substantially cylindrical wall portion and a removable roof, an integral burner ring mounted on and supported by the upper surface of said cylindrical wall portion, said removable roof resting on the upper surface of the burner ring, electrodes mounted on said roof and extending toward the bottom portion of said furnace, said integral burner ring comprising an annular metal frame, a refractory lining in said frame having an interior surface, said ring having openings angularly spaced around the ring and extending from the outside and through the interior surface of the ring, oxy-fuel burners mounted in said openings, said burners being mounted to direct oxy-fuel flames angularly downward toward the bottom portion and to avoid contact with the electrodes.

2. The apparatus described in claim 1 characterized by the ring having a flue opening at a location between successive angularly spaced burners for exhaust of products of combustion from the furnace.

3. The apparatus described in claim 2 characterized by the flue having a water jacket by which it is cooled.

4. The apparatus described in claim 1 characterized by the ring comprising said annular metal frame and a ceramic lining on the metal frame of much greater thickness than the material of the metal frame for protecting the frame from direct radiation heating from within the furnace.

5. The burner ring described in claim 1 characterized by the ring including a steel frame of channel cross section with the open side of the channel facing toward the center of the ring, ceramic refractory material substantially filling the channel of said frame for the full radial extent of the sides of the channel of the frame, the openings extending through the steel frame and through the refractory material, and another opening larger than the angularly spaced openings and through the frame and the ceramic for providing a flue for the escape of products of combustion from the furnace.

6. The burner ring described in claim 5 characterized by a cooling chamber enclosed within the ring and extending around at least most of the circumference of the ring, inlet and outlet fittings for cooling fluid to and from the cooling chamber, said fittings being located on the outside wall of the steel frame, and cooling fluid connections for all of the burners, all of said burners and their cooling fluid connections being supported from the ring and being accessible from outside the ring.

7. The apparatus described in claim 1 characterized by the direct arc furnace having a side wall of substantially the same circumferential shape as the ring, said ring being supported on top of the side wall and being of an inside diameter to form a continuation of the inside wall of the furnace, the longitudinal axis of each of the burners being at an acute angle to a radial plane that passes through the axis of the furnace and through the longitudinal axis of the burner at the inner end of the burner, the inner ends of the burners being close to the inside surface of the wall of the furnace but being set back so that none of the burners projects beyond the inside surfaces of the ring and the furnace wall.

8. The combination described in claim 7 characterized by the wall of the furnace being made at least in part of ceramic blocks, and the furnace having a roof constructed at least in part of an arch of ceramic blocks, said electrodes extending through the arch of the roof of the furnace and down into the furnace to a level at which is located the material that is to be melted in the furnace.

9. The combination described in claim 7 characterized by the furnace having a removable roof that can be lifted to install or remove the ring, and the roof being supported on the ring when the ring is assembled with the furnace, and electrodes extending through the arch of the roof of the furnace and down into the furnace to a low level at which is located the material that is to be melted in the furnace.

10. The combination described in claim 7 characterized by a roof on the furnace resting on the ring, a plurality of electrodes extending through the roof and downward in the furnace to a level substantially lower than the burners and to the region at which is located the material to be melted in the furnace, the angle of each burner being such as to locate flame jets from the burners in the furnace radially outward from the electrodes and between the electrodes and the inside wall of the furnace.

11. The combination described in claim 10 characterized by the burners being oxy-fuel gas burners, each of the burners having jet orifices and means for regulating the flow of fluid through said jet orifices, the flow-regulating means being adjustable to change the flames from the burners from long flames that reach a bottom of the furnace to short local flames at the burner orifices for keeping the orifices open and free of clogging by molten metal splashing in the furnace.

12. The combination described in claim 7 characterized by the wall of the furnace having a door therein through which material to be melted is charged into the furnace, a spout through which molten metal can be poured from the furnace, and trunnions on which the furnace is tilted for pouring metal through the spout after the metal has been melted.

13. The method of operating a direct arc furnace having a side wall section, a roof section, and a burner ring located at the top of the side wall section and on which the roof section rests, the furnace having electrodes extending downward through the roof to the level of the metal located in the furnace in the lower part thereof in position to be melted, and angularly spaced burners extending through the ring and supported thereby, which method comprises initially heating the material in the furnace by projecting long flames from the burners downward against the material to be melted and with the long flames having a tangential component that causes them to pass outward of and around the group of electrodes, and after an initial meltdown by the flames, supplying power to the electrodes to continue the melting of the material in the furnace, and continuing to operate the burners with short flames that do not reach the material being melted but that keep the burner outlets free of clogging with splatter from the melt, and controlling the atmosphere of the furnace by regulating oxygen and fuel supplied to the burners when operating the burners with the short flames.

14. A portable burner ring comprising an annular member having a metal framework supporting a refractory lining, a plurality of ports in said member, oxy-fuel burners adjustably mounted in said ports, means for circulating cooling fluid through at least part of said annular member and an opening in said member through which products of combustion may pass.

References Cited

UNITED STATES PATENTS

| | | | |
|---|---|---|---|
| 2,268,603 | 1/1942 | Linder | 431—176 X |
| 2,649,903 | 8/1953 | Russell | 431—176 X |
| 2,679,390 | 5/1954 | Sprow. | |
| 2,803,092 | 8/1957 | Yerger | 263—44 X |
| 2,976,854 | 3/1961 | Vogeli | 263—44 X |
| 3,136,835 | 6/1964 | Dillon et al. | 13—9 |
| 3,193,264 | 7/1965 | Rummel | 266—33 X |
| 3,197,539 | 7/1965 | Hinds | 13—2 |
| 3,234,010 | 2/1966 | Mahony | 266—11 X |

BERNARD A. GILHEANY, Primary Examiner

H. B. GILSON, Assistant Examiner

U.S. Cl. X.R.

431—173